United States Patent
Newell

(10) Patent No.: US 10,404,370 B1
(45) Date of Patent: Sep. 3, 2019

(54) COMMUNICATION DEVICE FOR FACILITATING COMMUNICATION USING LIGHT RADIATION

(71) Applicant: Steven Wayne Newell, Independence, MO (US)

(72) Inventor: Steven Wayne Newell, Independence, MO (US)

(73) Assignee: Steven Wayne Newell, Independence, MO (US)

( * ) Notice: Subject to any disclaimer, the term of this patent is extended or adjusted under 35 U.S.C. 154(b) by 0 days.

(21) Appl. No.: 16/035,284

(22) Filed: Jul. 13, 2018

(51) Int. Cl.
*H04B 10/114* (2013.01)

(52) U.S. Cl.
CPC .................... *H04B 10/114* (2013.01)

(58) Field of Classification Search
CPC ........................................ H04B 10/114
USPC .......................................... 398/115
See application file for complete search history.

(56) References Cited

U.S. PATENT DOCUMENTS

| | | | |
|---|---|---|---|
| 2014/0178080 A1* | 6/2014 | Chen ........... | H04B 10/116 398/172 |
| 2015/0147067 A1* | 5/2015 | Ryan ........... | H04B 10/116 398/118 |
| 2016/0005335 A1* | 1/2016 | Alsadah ....... | G09B 21/007 340/4.12 |
| 2016/0218804 A1* | 7/2016 | Raj ............. | H04B 10/116 |
| 2016/0365480 A1* | 12/2016 | Mi .............. | H01L 33/06 |

* cited by examiner

Primary Examiner — Dalzid E Singh
(74) *Attorney, Agent, or Firm* — Steven Wayne Newell

(57) ABSTRACT

Disclosed is a communication device for facilitating communication using light radiation. Further, the communication device may include an input port configured to receive input data and a processing device communicatively coupled to the input port. Further, the communication device may include a memory device communicatively coupled to the processing device. Further, the memory device may be configured to store the input data. Further, the communication device may include at least three light emitters configured to emit light radiation characterized by at least three frequencies. Further, the at least three light emitters may be communicatively coupled to the processing device. Further, an operational state of the at least three light emitters may be controllable by the processing device based on the input data. Further, the communication device may include a power source configured to provide electrical energy to the at least three light emitters, the processing device, and the memory device.

19 Claims, 20 Drawing Sheets

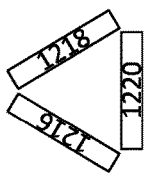
FIG. 12A
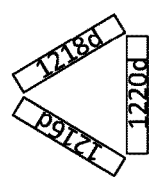
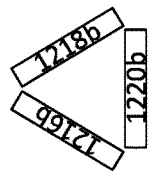
FIG. 12B
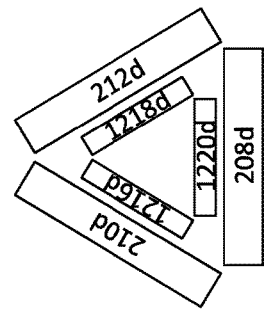
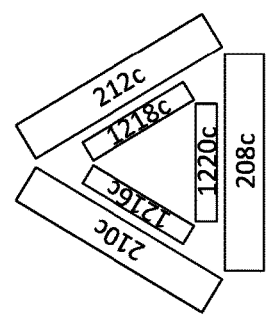
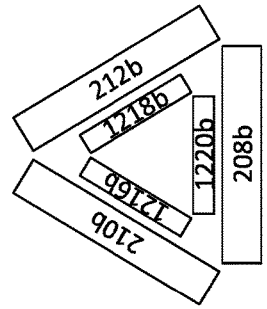
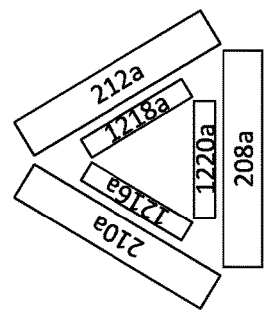
FIG. 12c

COMMUNICATION DEVICE FOR FACILITATING COMMUNICATION USING LIGHT RADIATION

FIELD OF THE INVENTION

The present disclosure relates generally to the field of communication devices. More specifically, the present disclosure describes a communication device for facilitating communication using light radiation.

BACKGROUND OF THE INVENTION

Generally, people communicate with each other using communication devices such as mobile phones. Further, communication devices usually transfer data using microwave radiation. However, use of microwave radiation may be unhealthy and might potentially impact human health.

Further, modern day technology uses binary coding for storing, processing and transferring data. The binary coding represents data using a two-symbol system and is machine-readable. However, binary code is not human readable. Further, usage of binary code may not be versatile. Moreover, data streaming and processing performed using binary code in a critical situation such as in a combat situation may not be fast enough.

Generally, home base systems respond to users in either a visual or an audio output. Moreover, the range to receive an input signal using an input device such as a microphone is restricted to a small area. Further, users who are visually impaired may find it difficult to use home-based systems such as Homepod® or Alexa®.

Therefore, there is a need for improved communication device for facilitating communication using light radiation that may overcome one or more of the above-mentioned problems and/or limitations.

SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a communication device for facilitating communication using light radiation is disclosed. The communication device may include an input port configured to receive input data. Further, the communication device may include a processing device communicatively coupled to the input port. Further, the communication device may include a memory device communicatively coupled to the processing device. Further, the memory device may be configured to store the input data. Further, the communication device may include at least three light emitters configured to emit light radiation characterized by at least three frequencies. Further, the at least three light emitters may be communicatively coupled to the processing device. Further, an operational state of the at least three light emitters may be controllable by the processing device based on the input data. Further, the communication device may include a power source configured to provide electrical energy to the at least three light emitters, the processing device, and the memory device.

According to some embodiments, a communication device for facilitating communication using light radiation is disclosed. The communication device may include an input port configured to receive input data. Further, the communication device may include a processing device communicatively coupled to the input port. Further, the communication device may include a memory device communicatively coupled to the processing device. Further, the memory device may be configured to store the input data. Further, the communication device may include at least three light emitters configured to emit light radiation characterized by at least three frequencies. Further, the at least three light emitters may be communicatively coupled to the processing device. Further, an operational state of the at least three light emitters may be controllable by the processing device based on the input data. Further, the communication device may include at least three braille cells corresponding to the at least three light emitters. Further, the at least three braille cells may be communicatively coupled to the processing device. Further, a braille operational state of the at least three braille cells may be controllable by the processing device. Further, the braille operational state may include one of a depressed state and a protruded state. Further, the communication device may include a power source configured to provide electrical energy to the at least three light emitters, the processing device, the memory device and the at least three braille cells.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 12A is an exemplary illustration of at least three braille cells, in accordance with some embodiments.

FIG. 12B is an exemplary illustration of one or more set of at least three braille cells, in accordance with some embodiments.

FIG. 12C is an exemplary illustration of one or more set of at least three braille cells co-arranged with one or more set of at least three light emitters, in accordance with some embodiments.

DETAIL DESCRIPTIONS OF THE INVENTION

Figure 1:
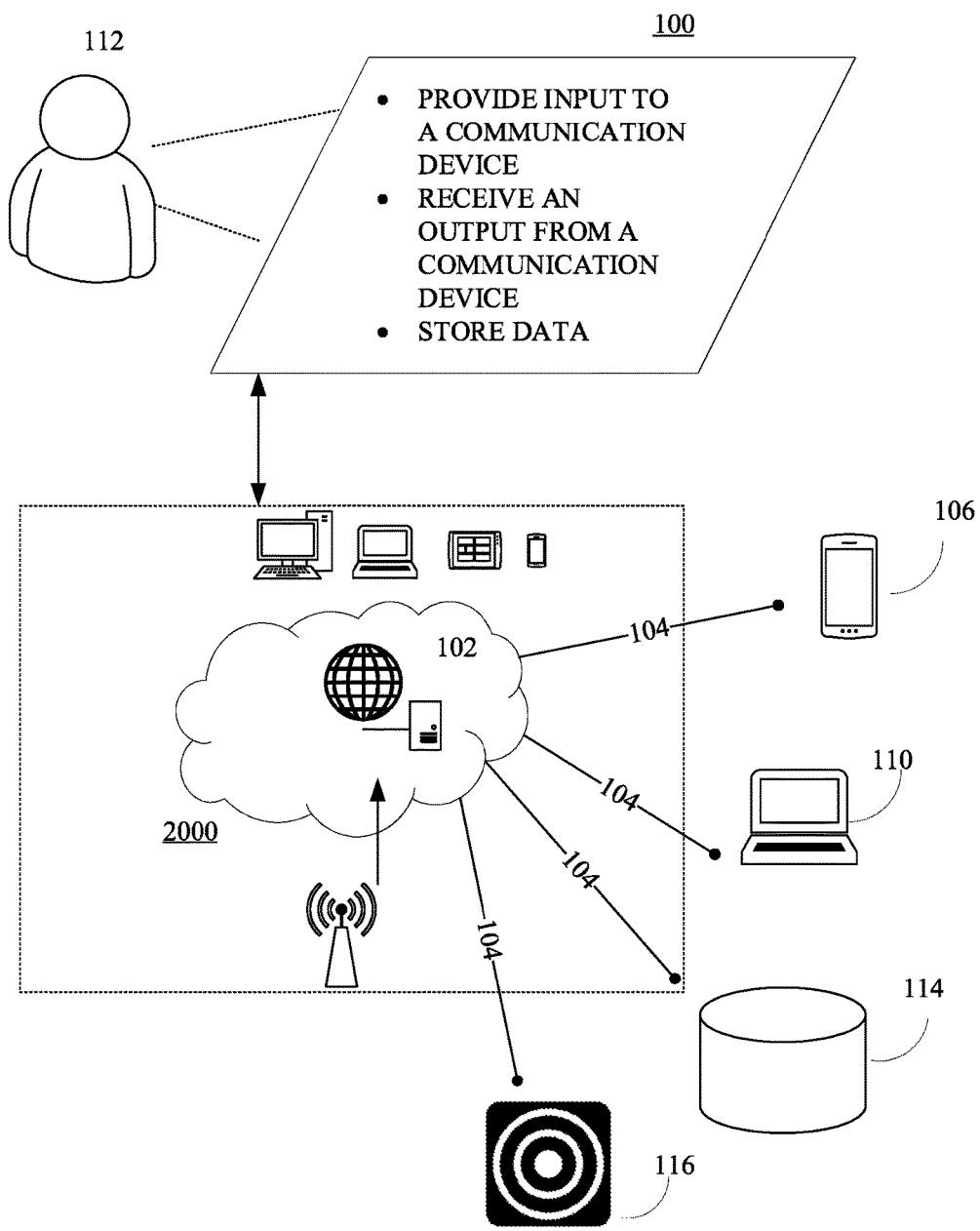
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a communication device for facilitating communication using light radiation, embodiments of the present disclosure are not limited to use only in this context.

Overview

According to some embodiments, the present disclosure may include a program that converts Azureakandt language code back into the alpha-numeric letters. Further, the present disclosure may be an electronic light flashing signal communicator that uses the three sides of a symbol. For an instance, the symbol may be a triangle. Further, the electronic light flashing signal may illuminate three colors for each side of the symbol and may result in words and sentences in a code of Azureakandt. Further, the present disclosure may include a system of coded communication that may be both human-readable language, and also machine-readable language. Further, illumination of colors may not be required in the present disclosure for human eyes. For an instance, in order to read a symbol, a human eye may not require color associated with the symbol. However, in machine language communication, a computer receptor may receive an input signal only by detecting colors. Further, the code may be expanded with a multitude of alphabet systems. Further, the code may be a DNA codon referenced language communication system that may also be adapted for communication in cyberspace, as well as encryption.

Further, the present disclosure may be placed on a headband or hat worn by a user. Further, the present disclosure may include an infrared receptor that may be compatible with a smart-home hub such as HomePod® or Alexa®. For example, the infrared receptor may be a USB plug-in attachment. Further, the user may speak into a microphone that may be embedded into the present disclosure, while looking towards the infrared receptor. Accordingly, the present disclosure may convert the words spoken by the user into the code using Natural Language Processing (NLP). Further, the code may be transmitted using an infrared signal. Accordingly, the infrared signal may be detected by the infrared receptor attached to the smart-home hub. For an instance, a user may be mowing in the front yard of the house. Further, the user may talk, and the discrete sound of the user's voice may be recognized by the present disclosure. Accordingly, a signal may be transmitted to a receptor dish that may be mounted on the garden night-lights over the user's patio. Further, a user's smart-home hub may receive the signal. Further, transmission of the signal may not be done using microwave radiation, and hence may retain the privacy of a user.

Further, a researched mathematical analysis of the adaptability of the code that may be a human-readable written language as well as a machine language is disclosed. Moreover, the code may be encoded on a regular system using three distinct frequency *.WAV files.

$$F(x)dx = \int h\{f(x_1) + f(x_2) + f(x_3)\}$$

wherein,
$x_1$ is first frequency,
$x_2$ is second frequency,
$x_3$ is third frequency.

Further, the code may use the trapezoid rule. Given that the limits with a definite integral for a system that lets the function of x be such that any x and y coordinates of "A" and "B" on a continuous wave progression for a two dimensional curve on a grid may provide a mid-point of signal wave efficiency in reducing data flow volume commensurate with the reduced number of points tracked to give equivalent information for an algorithm of the curve of the wave. Given three points only for a definite integral location to be abstracted from the input curve of the *.WAV file sin configuration in the formula analysis system. Further, the data flow volume may be reduced over a transmission line from an average of the following equation.

$$F(x)dx = \frac{h}{2}\int_n^\infty \{f(x_0) + 2f(x_1) + 2f(x_2) + 2f(x_3) \ldots + 2f(x_n)\}$$

wherein,
$x_1$ is first frequency,
$x_2$ is second frequency,
xn is $n^{th}$ frequency.

Further, adaptability of the code may be greater than binary code. Further, the code may be converted to a specific three-bandwidth infrared signal for a radio silent code system and may be transmitted as light across a room.

Further, the present disclosure may be deployed for data processing in machines. For an instance, a camera placed for an AI for a missile aiming towards a target using a standard specification of a digital technology in a camera may try to process images received from the camera. Further, the AI may analyze to reconnaissance about the missile heading towards the target. Moreover, the processing speed of data may be a very important factor. For an instance, the speed of repeated scans over a field to detect a signature of a radioactive material in an area such as an industrial complex.

Further, a processor may not require all the data from the available field of input. For an instance, the algorithm may learn over time and may be able to back-calculate from the data in three input frequency areas of the image, to fill in any necessary additional color or light density detail to make the full image based on the analysis at the end of the computation if required.

Further, the present disclosure may transmit a signal in three binary frequencies, an on/off question in red color, an on/off question in green color and an on/off question in blue color, with the factor of sequence order and timing of the signal. Moreover, the present disclosure may also sense from a specialized sensor.

Further, the present disclosure may replace medic alert for old people and may include improved functions as compared to Alexa®. For an instance, the present disclosure may not require to clearly hear the sound of the word a user may speak in the air as long as the word spoken by the user is loud enough and clear enough to be processed. For example, a user may be mowing the lawn in the front yard and may simultaneously be able to communicate with her children over a cell phone. Further, navigation using the code as disclosed in the present disclosure may be faster in combat situations such as a user may able to correct the targeting angle on an anti-ballistic missile.

Further, the code disclosed in the present disclosure for faster communication may be able to derive an input sound from a user after analyzing filtered parts and pieces of the sound from the user for a duration of time. Similarly, image analysis may also be done. For an instance, an image on a monitor screen may be sparsely pixelated and may not be recognized by a user. However, the code disclosed in the present disclosure may fill in the full image on the screen by back-calculations. Further, the present disclosure may also be utilized by people with visual disability.

In some embodiments, the present disclosure may include a 3 frequencies light generator/encoder. Further, the present disclosure may include a diamond crystal refractor. Further, the angle of the refractor may be controlled mechanically in a frequency of vibration that may be defined by the speed of a rheostat electronic pulse. For an instance, the diamond crystal may be mounted on a metal hood mount wedge lever and may be able to vibrate up and down on an axis at a very fast frequency of vibration.

Further, the amount of angle to the vibration as well as the speed of the vibration may be adjusted by using anti-magnetism of a charged bismuth plate that may be placed under the mount of the diamond crystal and may be stimulated by a controlled frequency of vibration. Further, the controlled frequency of vibration may allow the timing control selecting wherein, the position of the diamond crystal may be the color frequency in angstroms of a light refracted by one of the three kinds of laser light sources. Further, an encrypted target zone may refine a determined engineered spot of the signal of the light that may turn "On" or "Off" based on the three-color code as encrypted in the control of the function of the light speed signal for the computer operations.

FIG. 1 is an illustration of an online platform 100 consistent with various embodiments of the present disclosure. By way of non-limiting example, the online platform 100 to facilitate communication between one or more user devices may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, and sensors 116 over a communication network 104, such as, but not limited to, the Internet. Further, users of the online platform 100 may include relevant parties such as, but not limited to, end users. Accordingly, in some instances, electronic devices operated by the one or more relevant parties may be in communication with the online platform 100.

A user 112, such as the one or more relevant parties, may access the online platform 100 through a web based software application or browser. The web based software application may be embodied as, for example, but not be limited to, a website, a web application, a desktop application, and a mobile application compatible with a computing device 2000.

According to some embodiments, the online platform 100 may be provided to facilitate communication between one or more user devices. For an instance, the one or more user devices may include a communication device, mobile devices 106, a smart-home hub, and other electronic devices 110 etc. For example, the smart-home hub such as Home-Pod® or Alexa® may be a hardware device that may connect the one or more devices over a network such as communication network 104 and may control communications among the one or more devices. Further, the communication device herein may be a hardware device that may facilitate communication using light radiation.

Further, the online platform 100 may integrate with the communication device and the smart-home hub. For an instance, the communication device may receive an input from a user using an input device such as a microphone. Accordingly, the input may be converted to a specific three-bandwidth infrared signal using the communication device. Further, the communication device may transmit the three-bandwidth infrared signal to the smart-home hub. For an instance, the smart-home hub may be embedded with photoreceptors. Further, the smart-home hub may perform a task based on the input. For example, a user may speak into the microphone to turn on the lights. Accordingly, a specific three-bandwidth infrared signal may be generated and transmitted to the smart-home hub. As a result, the smart-home hub may turn the lights on.

Further, users may transfer, save files using the communication device on databases 114 located on the online platform 100. For instance, a user may be mowing grass in the front yard of the house and may come up with an idea such as a recipe for a dish. However, the user may not have any device such as a mobile phone etc. in the vicinity of the user. Further, the user may speak about the idea into the microphone of the communication device. Further, the communication device may convert the idea i.e. an input signal into a three-bandwidth infrared signal. Further, the online platform 100 may detect the three-bandwidth infrared signal using infrared receptors that may be in the vicinity of the user. For instance, the infrared receptors may be mounted on one or more garden night-lights over the user's patio. Further, the online platform 100 may store the input signal as a file on databases 114. Moreover, the user may access the files stored on the databases 114 using the online platform 100 via the one or more user devices.

Figure 2:
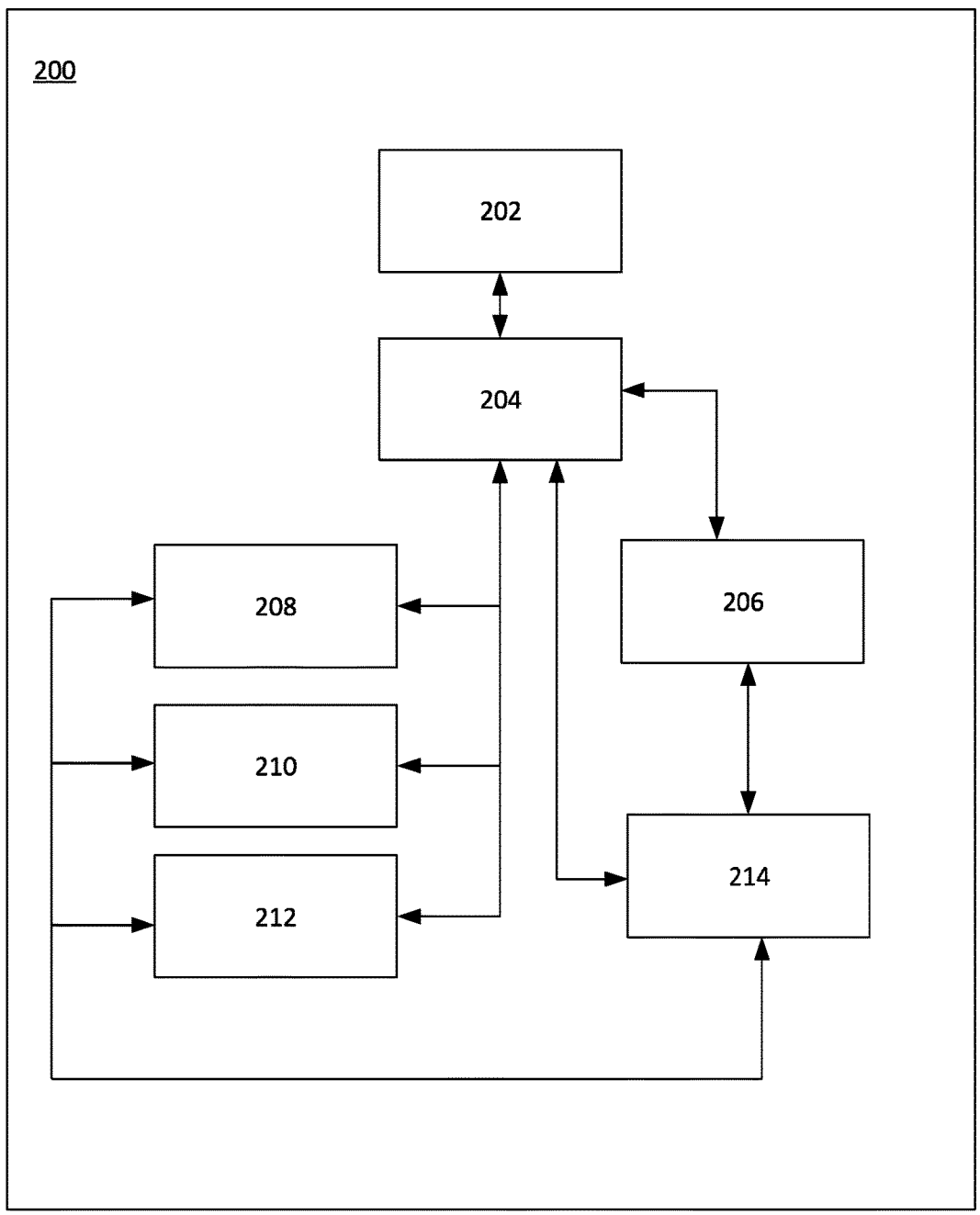
FIG. 2 is a block diagram of a communication device for facilitating communication using light radiation, in accordance with some embodiments.
Figure 3:
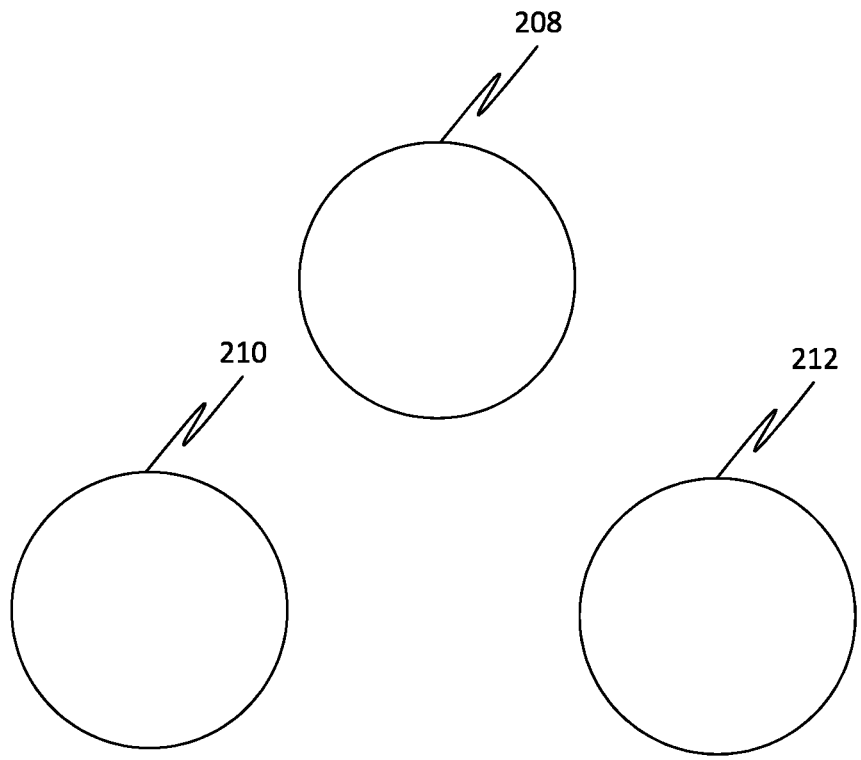
FIG. 3 shows an illustration of at least three light emitters, in accordance with some embodiments.

FIG. 2 is a block diagram of a communication device 200 for facilitating communication using light radiation, in accordance with some embodiments. The communication device 200 may include an input port 202 configured to receive input data. Further, the communication device 200 may include a processing device 204 communicatively coupled to the input port 202. Further, the communication device 200 may include a memory device 206 communicatively coupled to the processing device 204. Further, the memory device 206 may be configured to store the input data. Further, the communication device 200 may include at least three light emitters 208, 210, 212 configured to emit light radiation characterized by at least three frequencies as illustrated in FIG. 3. Further, the at least three light emitters 208, 210, 212 may be communicatively coupled to the processing device 204. Further, an operational state of the at least three light emitters 208, 210, 212 may be controllable by the processing device 204 based on the input data. Further, the communication device 200 may include a power source 214 configured to provide electrical energy to the at least three light emitters 208, 210, 212, the processing device 204 and the memory device 206.

Figure 4:
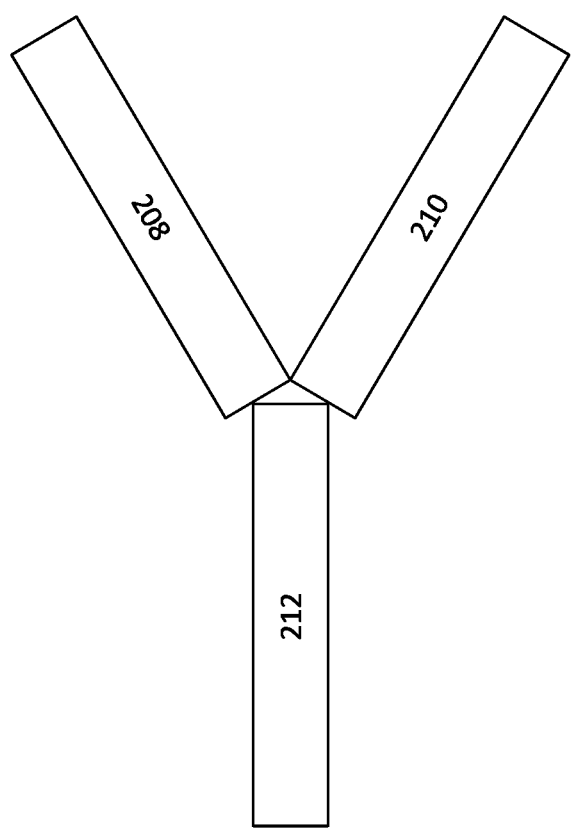
FIG. 4 shows an illustration of at least three light emitters characterized by an elongated form, in accordance with some embodiments.
Figure 5:
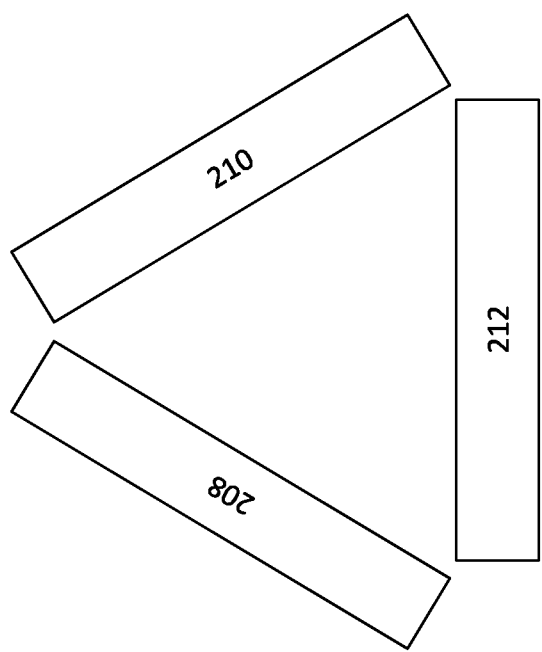
FIG. 5 shows an illustration of at least three light emitters arranged to form a triangular shape, in accordance with some embodiments.

In some embodiments, each of the at least three light emitters may be characterized by an elongated form as illustrated in FIG. 4. Further, the at least three light emitters 208, 210, 212 may be arranged to form a triangular shape as illustrated in FIG. 5.

In some embodiments, the at least three emitters 208, 210, 212 may include a first light emitter 208, a second light emitter 210 and a third light emitter 212.

In some embodiments, the first light emitter 208 may be configured to emit light characterized by frequencies in the range 400 THz to 484 THz. Further, the second light 210 emitter may be configured to emit light characterized by frequencies in the range 526 THz to 606 THz. Further, the third light 212 emitter may be configured to emit light characterized by frequencies in the range 606 THz to 668 THz.

Figure 6:
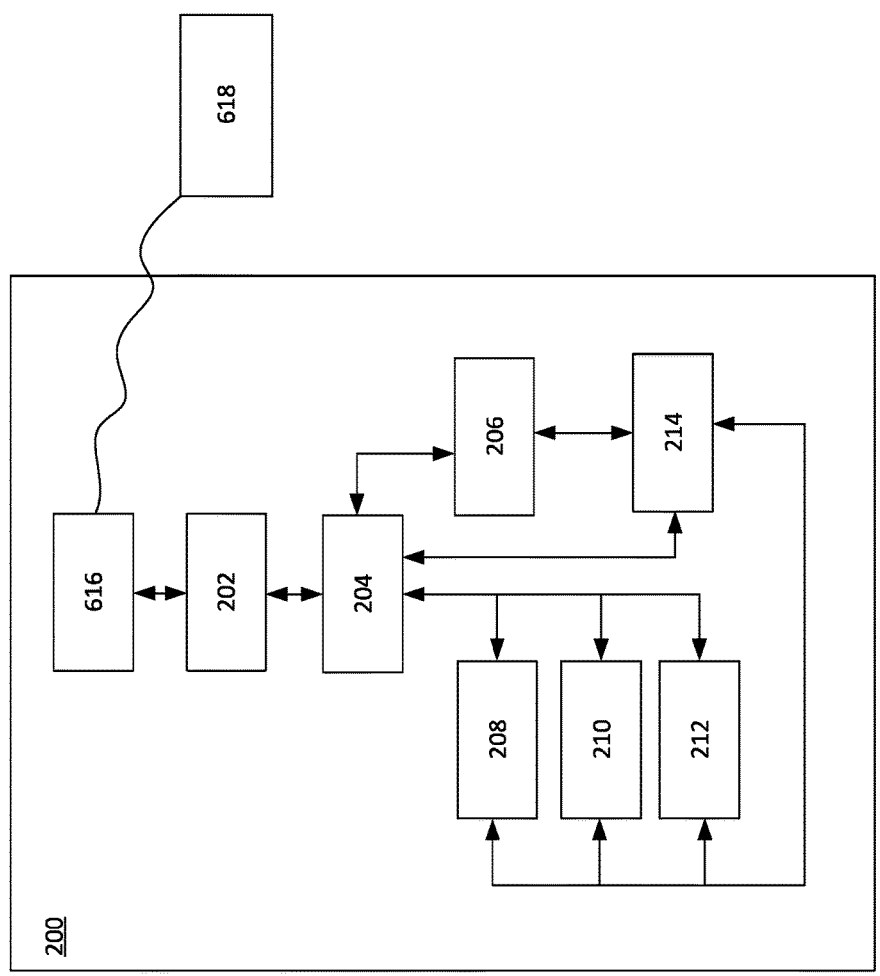
FIG. 6 is a block diagram of a communication device embedded with a wireless receiver for facilitating communication using light radiation, in accordance with some embodiments.

In some embodiments, the communication device 200 may further include a wireless receiver 616 communicatively coupled to the input port 202 as illustrated in FIG. 6. Further, the wireless receiver 616 may be configured to receive the input data from an external device 618 over a Radio-Frequency (RF) communication channel.

Figure 7:
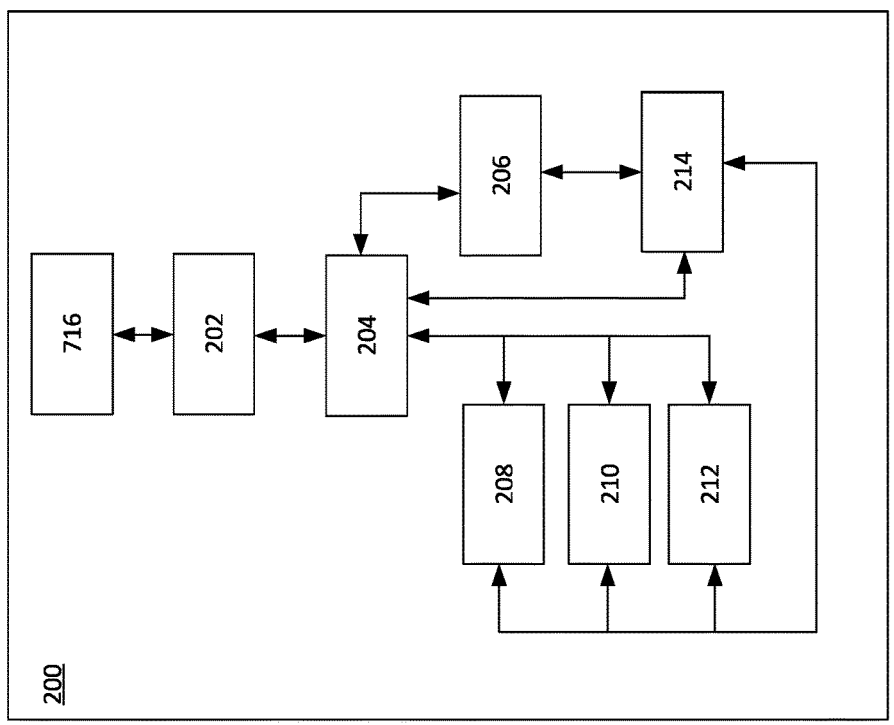
FIG. 7 is a block diagram of a communication device embedded with a microphone for facilitating communication using light radiation, in accordance with some embodiments.

In some embodiments, the communication device 200 may further include a microphone 716 communicatively coupled to the input port 202 as illustrated in FIG. 7. Further, the microphone 716 may be configured to detect an acoustic signal. Further, the processing device 204 may be configured to control the operational state of at least three light emitters 208, 210, 212 based on the acoustic signal.

In some embodiments, the at least three frequencies fall in the range of 300 GHz to 430 THz.

Figure 8:
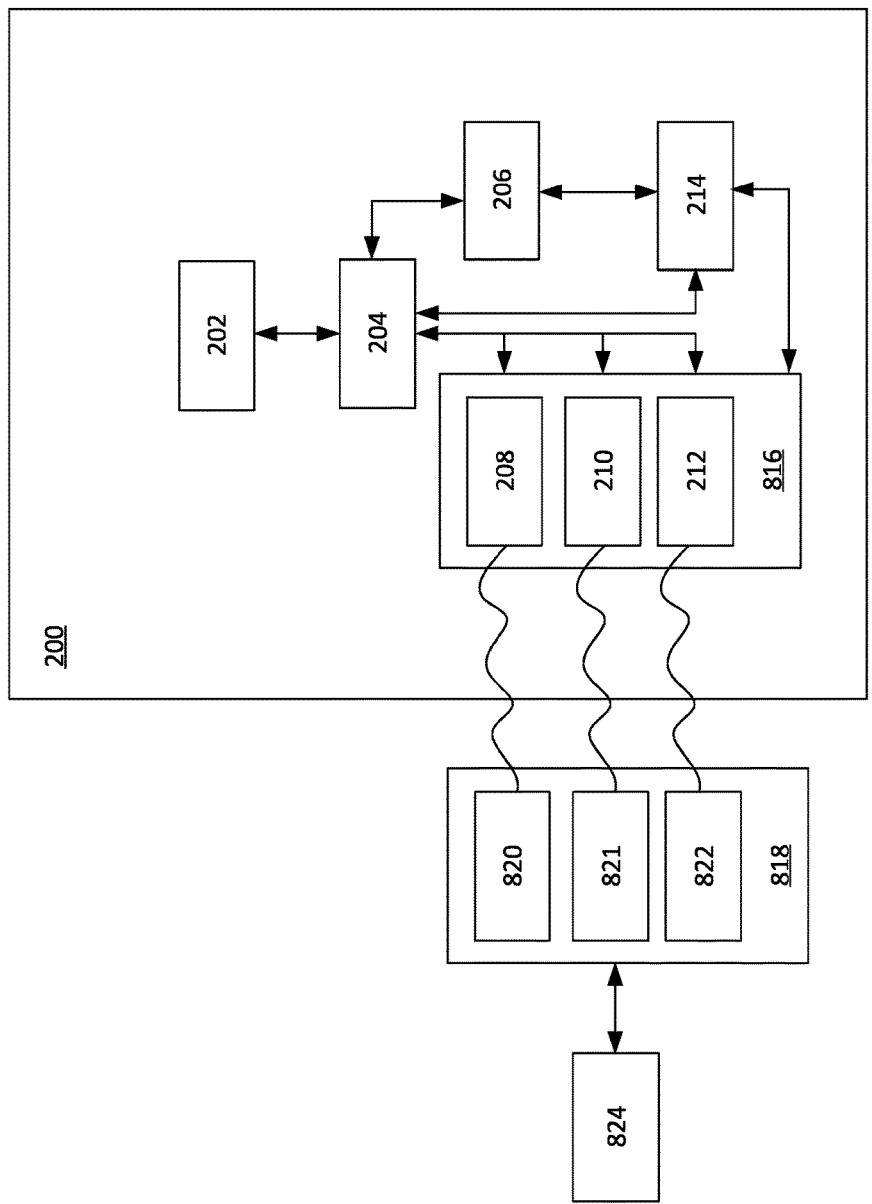
FIG. 8 is a block diagram of a communication device for facilitating communication using light radiation with a smart-home hub, in accordance with some embodiments.

In some embodiments, the at least three frequencies may be detectable by at least three infrared detectors 820, 821, 822 comprised in a smart-home hub 818 as illustrated in FIG. 8. Further, the smart-home hub 818 may be configured to control operation of at least one smart appliance 824 communicatively coupled to the smart-home hub 818.

Figure 19:
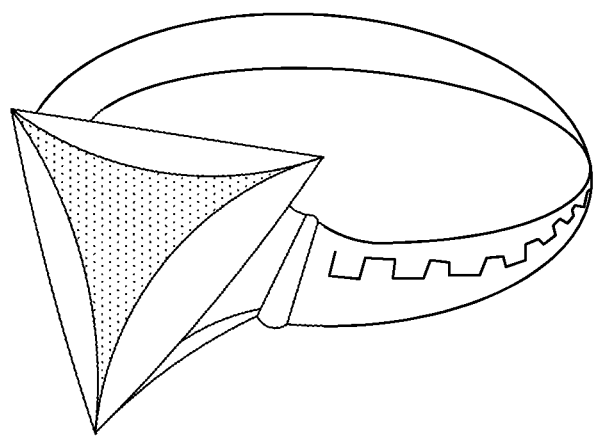
FIG. 19 is an exemplary illustration of a wearable article that may be embedded with a communication device, in accordance with some embodiments.

In some embodiments, at least three light emitters 208, 210, 212 may be configured to be disposed over a wearable article 816 as illustrated in FIG. 8. For example, the wearable article may be in the shape of a necklace as illustrated in FIG. 19.

Figure 9:
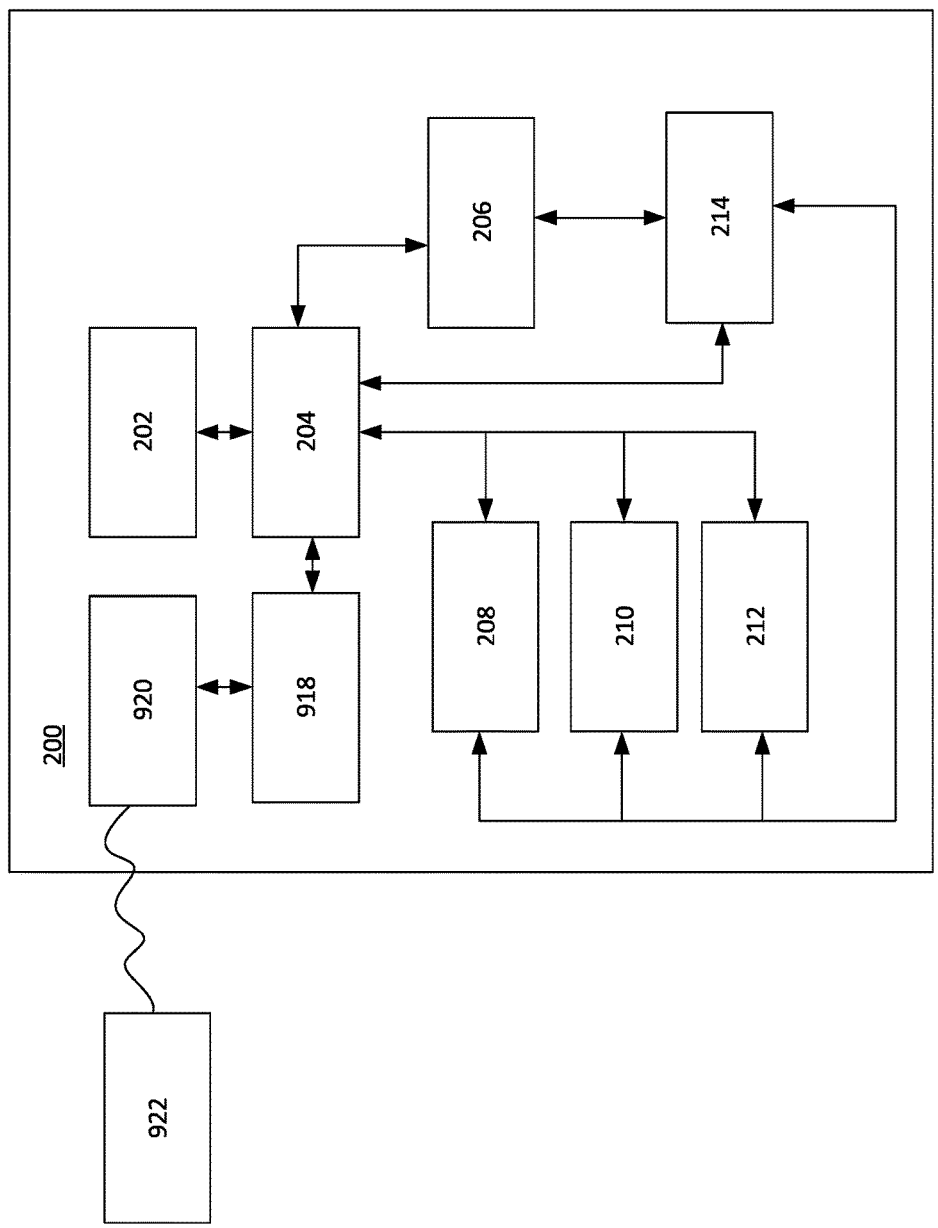
FIG. 9 is a block diagram of a communication device embedded with a wireless transmitter for facilitating communication using light radiation, in accordance with some embodiments.

In some embodiments, the communication device 200 may further include: an output port 918 communicatively coupled to the processing device 204; and a wireless transmitter 920 communicatively coupled to the output port 918 as illustrated in FIG. 9. Further, the wireless transmitter 920 may be configured to transmit an output data to an external device 922 over a Radio-Frequency (RF communication channel).

In some embodiments, the processing device 200 may be configured to encode the input data into Azureakandt symbols based on the Azureakandt language.

Figure 10:
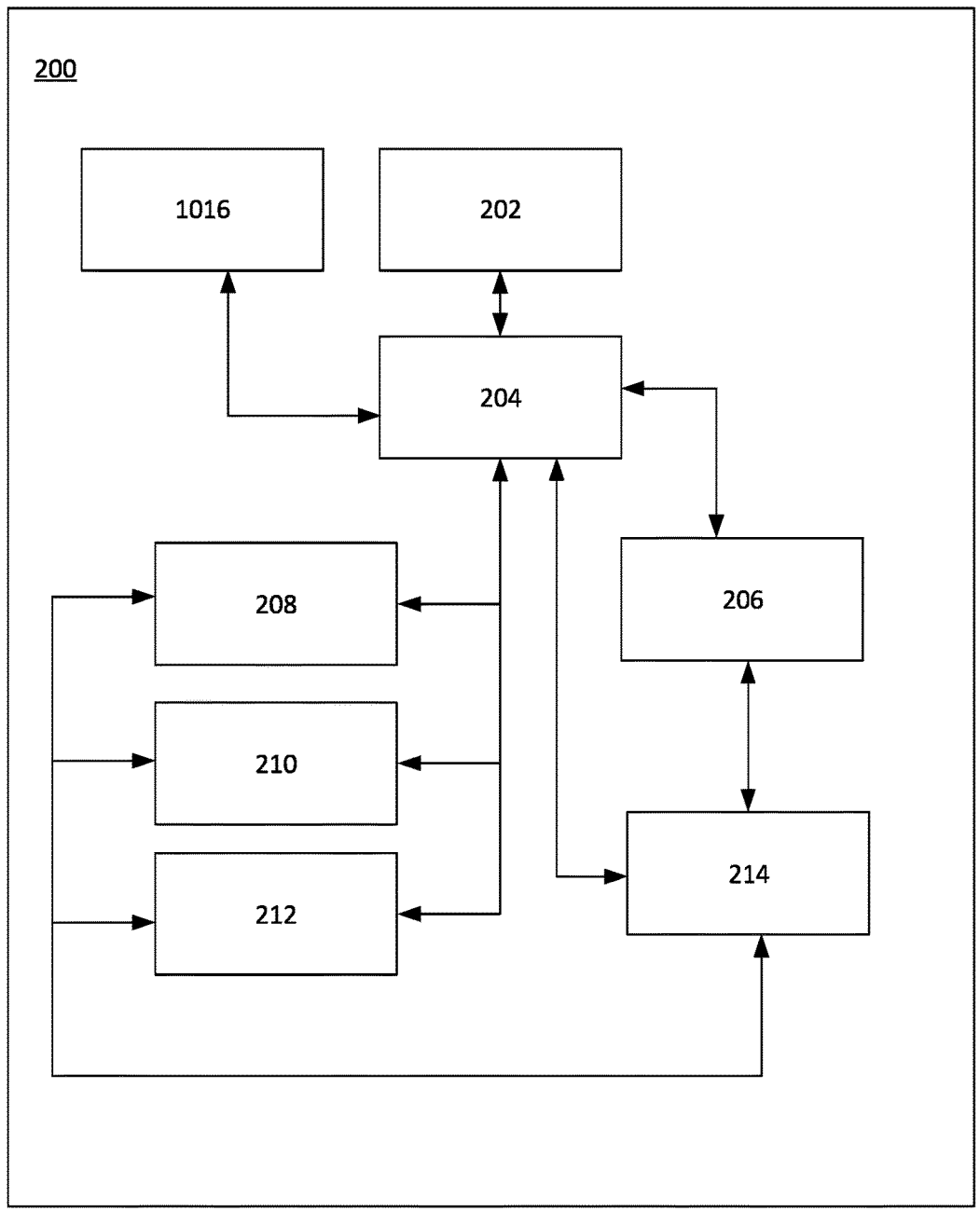
FIG. 10 is a block diagram of a communication device embedded with a clock generator for facilitating communication using light radiation, in accordance with some embodiments.

In some embodiments, the communication device 200 may further include a clock generator 1016 configured to generate a clock signal corresponding to a constant frequency as illustrated in FIG. 10. Further, the operational state of each of the at least three light emitters 208, 210, 212 may be exclusively controllable in a time period of the clock signal.

Figure 11A:
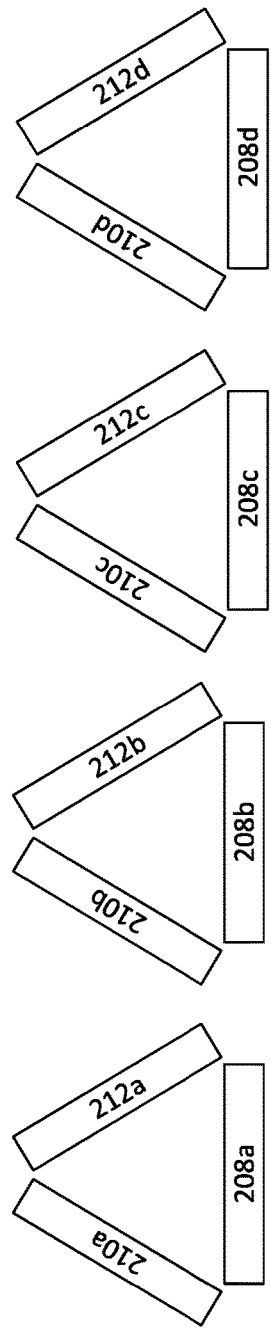
FIG. 11A is an exemplary illustration of one or more set of at least three light emitters arranged in a triangular shape, in accordance with some embodiments.

In some embodiments, the at least three light emitters 208, 210, 212 may include a first set of three light emitters 208a, 210a, 212a, a second set of three light emitters 208b, 210b, 212b, a third set of three light emitters 208c, 210c, 212c, and a fourth set of light emitters 208d, 210d, 212d. Further, each of the first set of three light emitters 208a, 210a, 212a, the second set of three light emitters 208b, 210b, 212b, the third set of three light emitters 208c, 210c, 212c, and the fourth set of light emitters 208d, 210d, 212d may be arranged to form a triangular shape as illustrated in FIG. 11A.

In some embodiments, the processing device 204 may be configured to encode the input data including an alphanumeric symbol into an Azureakandt symbol.

Figure 11B:
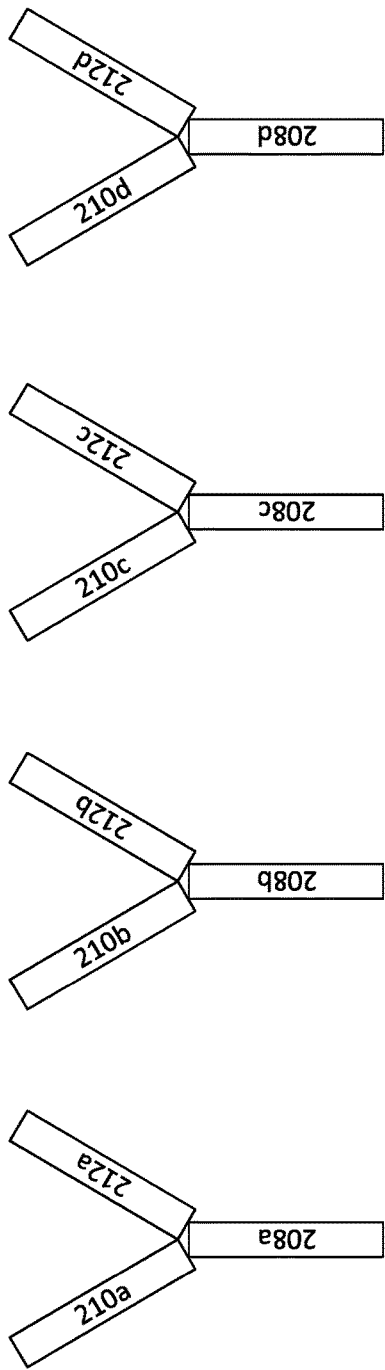
FIG. 11B is an exemplary illustration of one or more set of at least three light emitters arranged linearly, in accordance with some embodiments.

In some embodiments, the first set of three light emitters 208a, 210a, 212a, the second set of three light emitters 208b, 210b, 212b, the third set of three light emitters 208c, 210c, 212c, and the fourth set of light emitters 208d, 210d, 212 may be arranged linearly as illustrated in FIG. 11B.

In some embodiments, the communication device 200 may further include at least three braille cells 1216, 1218, 1220 as illustrated in FIG. 12A. Further, the at least three braille cells 1216, 1218, 1220 may include a first set of three braille cells 1216a, 1218a, 1220a, a second set of three braille cells 1216b, 1218b, 1220b, a third set of three braille cells 1216c, 1218c, 1220c, and a fourth set of braille cells 1216d, 1218d 1220d, as illustrated in FIG. 12B. Further, each of the first set of three light emitters 208a, 210a, 212a, the second set of three light emitters 208b, 210b, 212b, the third set of three light emitters 208c, 210c, 212c, and the fourth set of light emitters 208d, 210d, 212d may be co-arranged with the first set of three braille cells 1216a, 1218a, 1220a, the second set of three braille cells 1216b, 1218b, 1220b, the third set of three braille cells 1216c, 1218c, 1220c, and the fourth set of braille cells 1216d, 1218d 1220d correspondingly, as illustrated in FIG. 12C. Further, the at least three braille cells 1216, 1218, 1220 may be communicatively coupled to the processing device 204. Further, a braille operational state of the at least three braille cells 1216, 1218, 1220 may be controllable by the processing device 204. Further, the braille operational state may include one of a depressed state and a protruded state.

Figure 13:
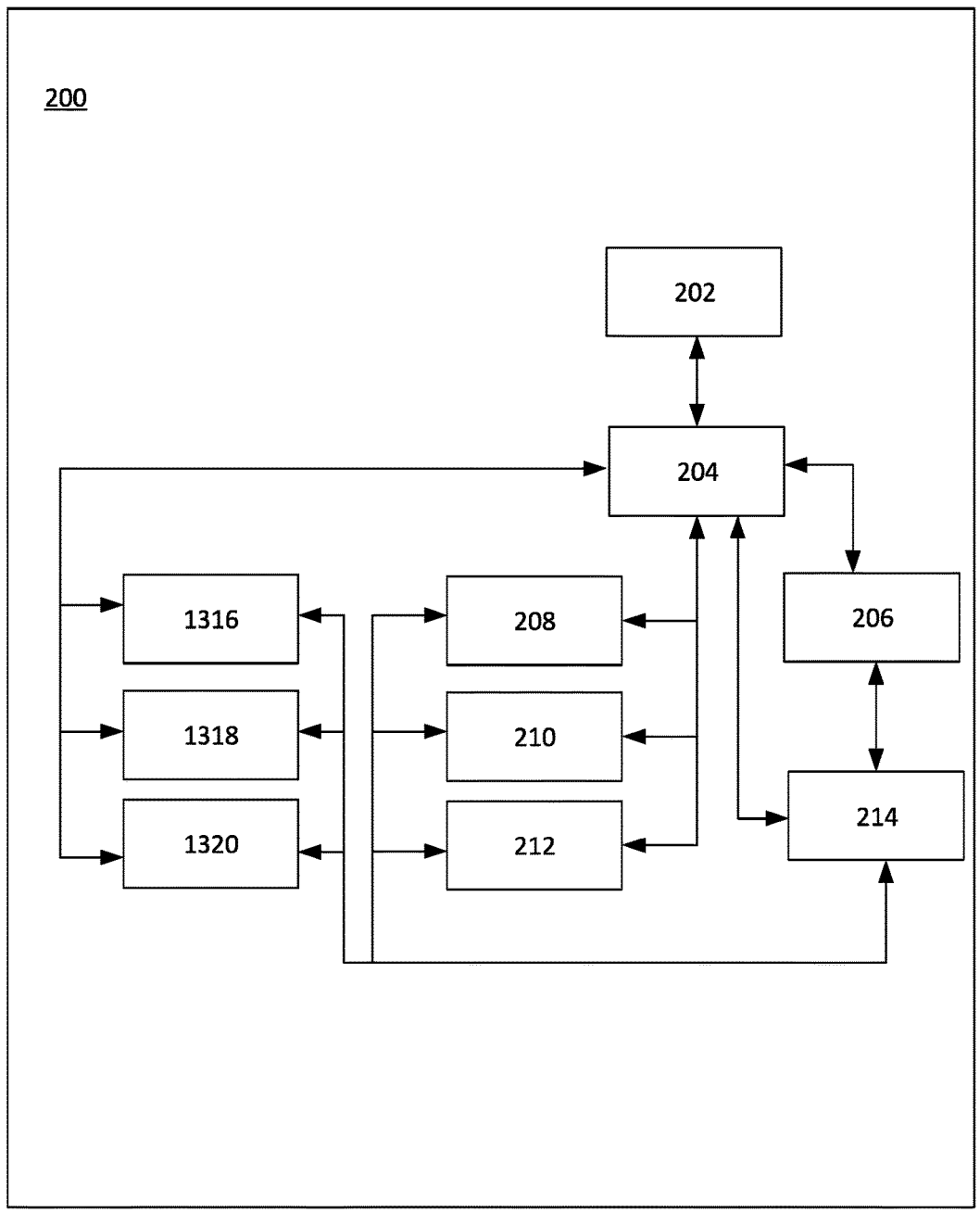
FIG. 13 is a block diagram of a communication device embedded with at least three braille cells for facilitating communication using light radiation, in accordance with some embodiments.

In some embodiments, the communication device 200 may further include at least three braille cells 1316, 1318, 1320 corresponding to the at least three light emitters 208, 210, 212 as illustrated in FIG. 13. Further, the at least three braille cells 1316, 1318, 1320 may be communicatively coupled to the processing device 204. Further, a braille operational state of the at least three braille cells 1316, 1318, 1320 may be controllable by the processing device 204. Further, the braille operational state may include one of a depressed state and a protruded state.

Figure 14:
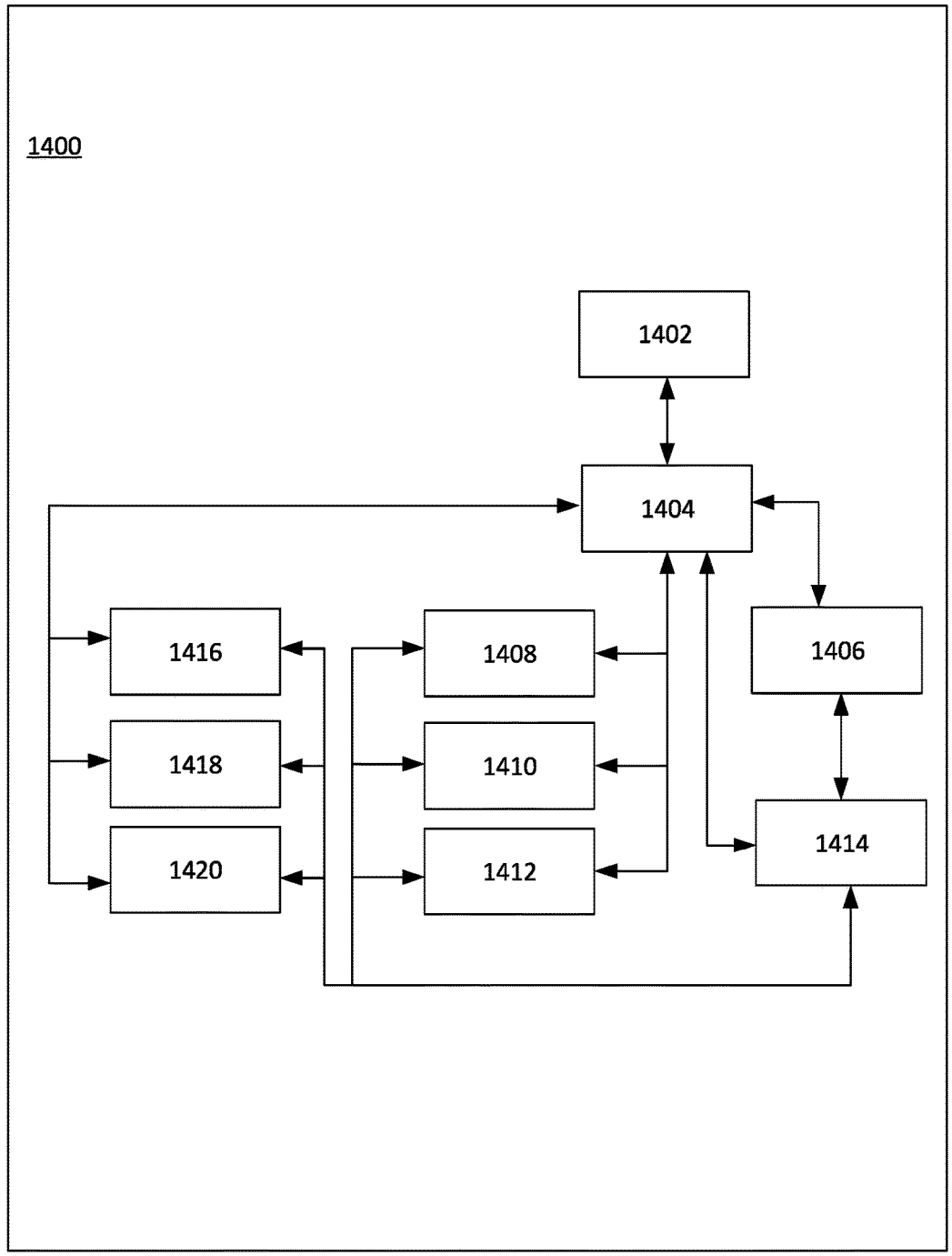
FIG. 14 is a block diagram of a communication device for facilitating communication using light radiation, in accordance with some embodiments.
Figure 15:
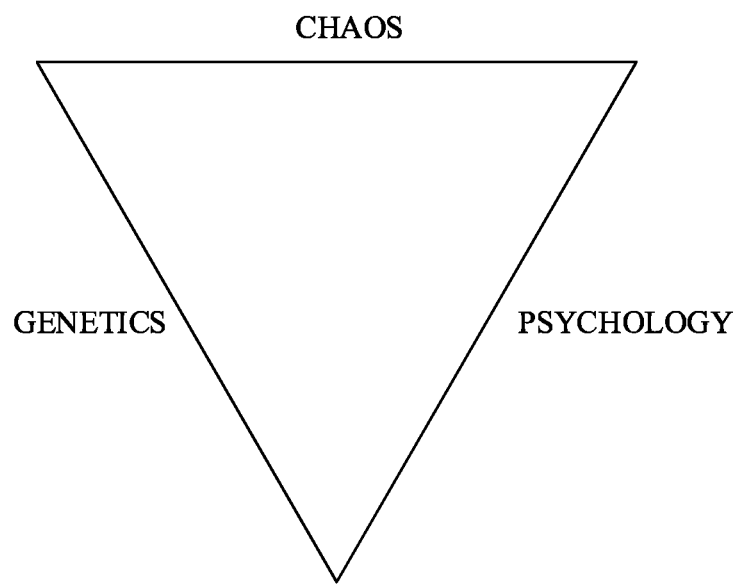
FIG. 15 is an exemplary illustration of human-readable words via a communication device, in accordance with some embodiments.

FIG. 14 is a block diagram of a communication device 1400 for facilitating communication using light radiation, in accordance with some embodiments. The communication device 1400 may include an input port 1402 configured to receive input data. Further, the communication device 1400 may include a processing device 1404 communicatively coupled to the input port 1402. Further, the communication device 1400 may include a memory device 1406 communicatively coupled to the processing device 1404. Further, the memory device 1406 may be configured to store the input data. Further, the communication device 1400 may include at least three light emitters 1408, 1410, 1412 configured to emit light radiation characterized by at least three frequencies. Further, the at least three light emitters 1408, 1410, 1412 may be communicatively coupled to the processing device 1404. Further, an operational state of the at least three light emitters 1408, 1410, 1412 may be controllable by the processing device 1404 based on the input data. Further, the communication device 1400 may include at least three braille cells 1416, 1418, 1420 corresponding to the at least three light emitters 1408, 1410, 1412. Further, the at least three braille cells 1416, 1418, 1420 may be communicatively coupled to the processing device 1408, 1410, 1412. Further, a braille operational state of the at least three braille cells 1416, 1418, 1420 may be controllable by the processing device 1404. Further, the braille operational state may include one of a depressed state and a protruded state.

Further, the communication device 1400 may include a power source 1414 configured to provide electrical energy to the at least three light emitters 1408, 1410, 1412, the processing device 1404, the memory device 1406 and the at least three braille cells 1416, 1418, 1420.

In some embodiments, each of the at least three light emitters 1408, 1410, 1412 may be characterized by an elongated form. Further, the at least three light emitters 1408, 1410, 1412 may be arranged to form a triangular shape. Further, the at least three Braille cells 1416, 1418, 1420 may be co-arranged with the at least three light emitters 1408, 1410, 1412 correspondingly.

In some embodiments, the at least three emitters 1408, 1410, 1412 may include a first light emitter 1408, a second light emitter 1410 and a third light emitter 1412. Further, the first light emitter 1408 may be configured to emit light characterized by frequencies in the range 400 THz to 484 THz. Further, the second light emitter 1410 may be configured to emit light characterized by frequencies in the range 526 THz to 606 THz. Further, the third light emitter 1412 may be configured to emit light characterized by frequencies in the range 606 THz to 668 THz.

Figure 16:
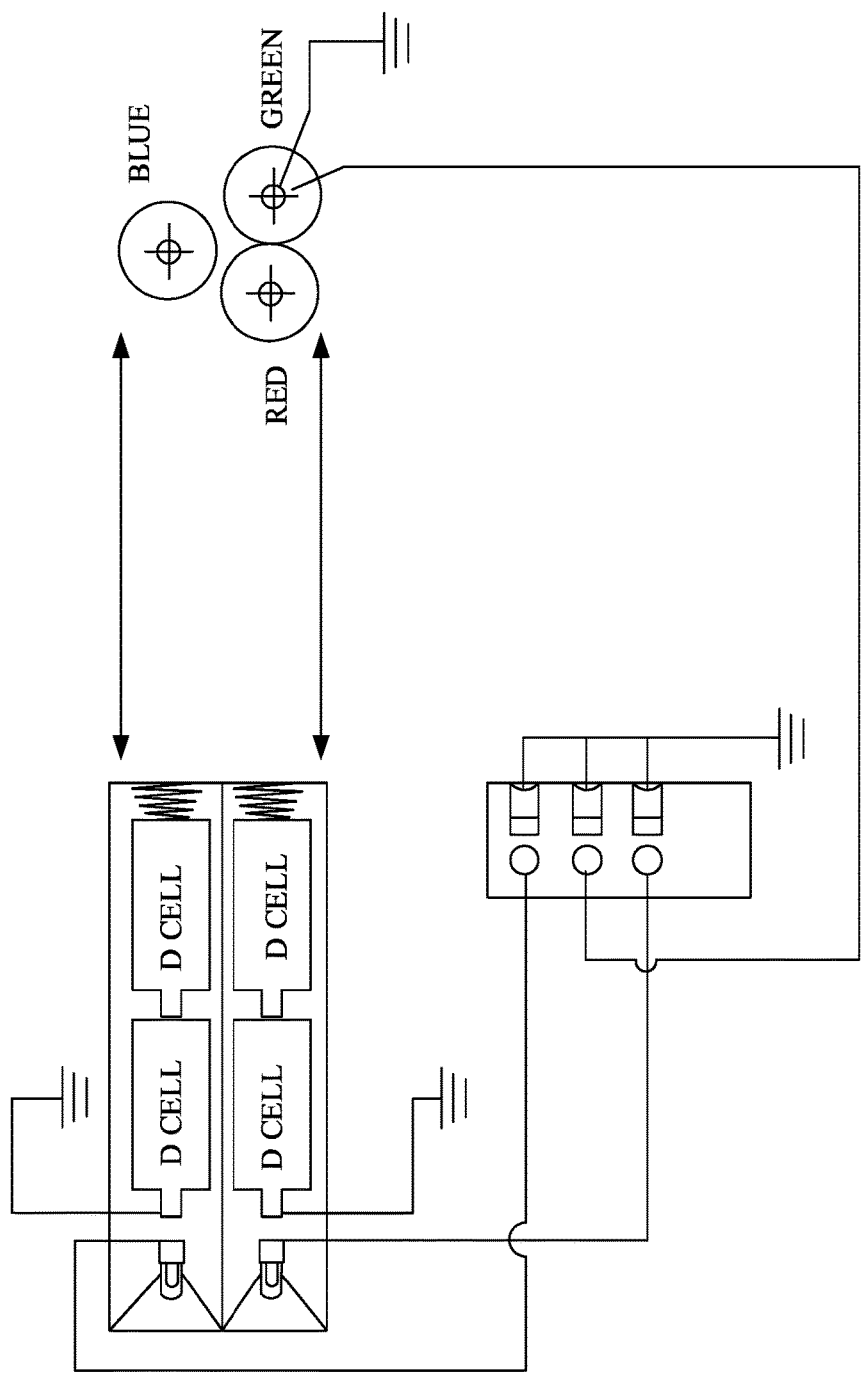
FIG. 16 is an illustration of a circuit diagram of a communication device embedded with three different light emitters corresponding to three different frequencies, in accordance with some embodiments.
Figure 18:
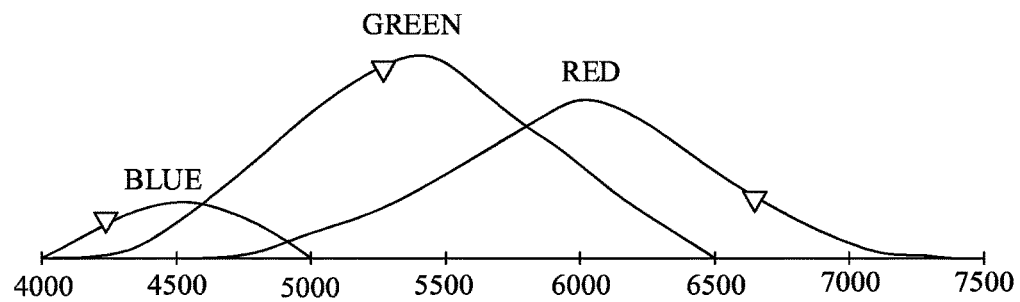
FIG. 18 is an illustration of three different frequencies emitted by three different light emitters, in accordance with some embodiments.

FIG. 16 is an illustration of a circuit diagram of a communication device embedded with three different light emitters corresponding to three different frequencies, in accordance with some embodiments. For an instance, the three different light emitters may emit light at three different frequencies. For example, the three different light emitters may include a first light emitter, a second light emitter, and a third light emitter. Accordingly, the first light emitter may be configured to emit light characterized by frequencies in the range 400 THz to 484 THz, wherein the second light emitter may be configured to emit light characterized by frequencies in the range 526 THz to 606 THz, wherein the third light emitter may be configured to emit light characterized by frequencies in the range 606 THz to 668 THz as illustrated in FIG. 18. Further, the power supply to these individual light emitters may be controlled by a processing device. For an instance, the processing device may receive a data from a user using an input device such as a microphone via an input port that may be embedded within the communication device. Further, the three different light emitters may be turned on or off, based on the data received from the user.

Figure 17:
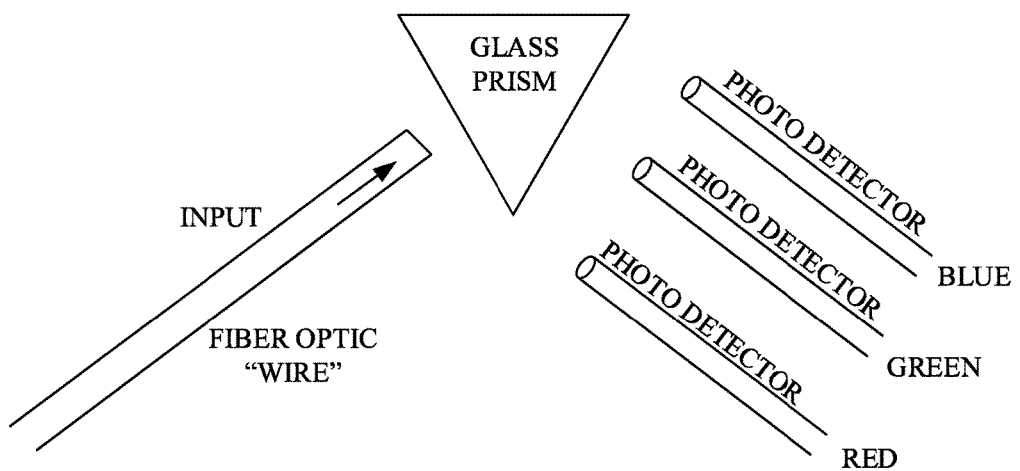
FIG. 17 is an illustration of a mechanism to obtain three different colors corresponding to three different frequencies, in accordance with some embodiments.

In some embodiments, instead of using three different light emitter, a mechanism to obtain three different colors corresponding to three different frequencies may be utilized. For an instance, the mechanism may include a prism such as a diamond crystal or glass prism as illustrated in FIG. 17. Further, the prism may be utilized to refract an input light such as a beam of white light. For an instance, the beam of white light may be generated by a light source and may be transmitted to the prism using a fiber optic wire. Further, refraction of the white light through the prism may result in one or more beam of colored light such as a red light, a blue light, a green light etc. Moreover, the angle at which refraction takes place may be controlled mechanically. For example, a frequency of vibration may be defined by the speed of a rheostat electronic pulse. Further, the prism such as the diamond crystal may be mounted on a metal hood mount wedge lever. Accordingly, the metal hood mount wedge lever may move in a lateral direction on an axis, at a very fast frequency of vibration. For instance, a bismuth plate may be placed under the diamond crystal. Further, the angle at which refraction takes place, as well as the frequency of vibration of the diamond crystal may be adjusted using the anti-magnetism of the bismuth plate. Moreover, a frequency of vibration may determine the position of the diamond crystal at a moment. Further, one or more photo-detectors may be utilized to detect the one or more beam of colored light such as blue, green, and red etc. For example, at a moment, the processing device may receive a data from a user using an input device such as a microphone via an input port embedded within the communication device. Accordingly, the processing device may analyze the input and determine the position of the diamond crystal at the moment. As a result, the processing device may also turn on and off the one or more photodetectors based on the data.

Figure 20:
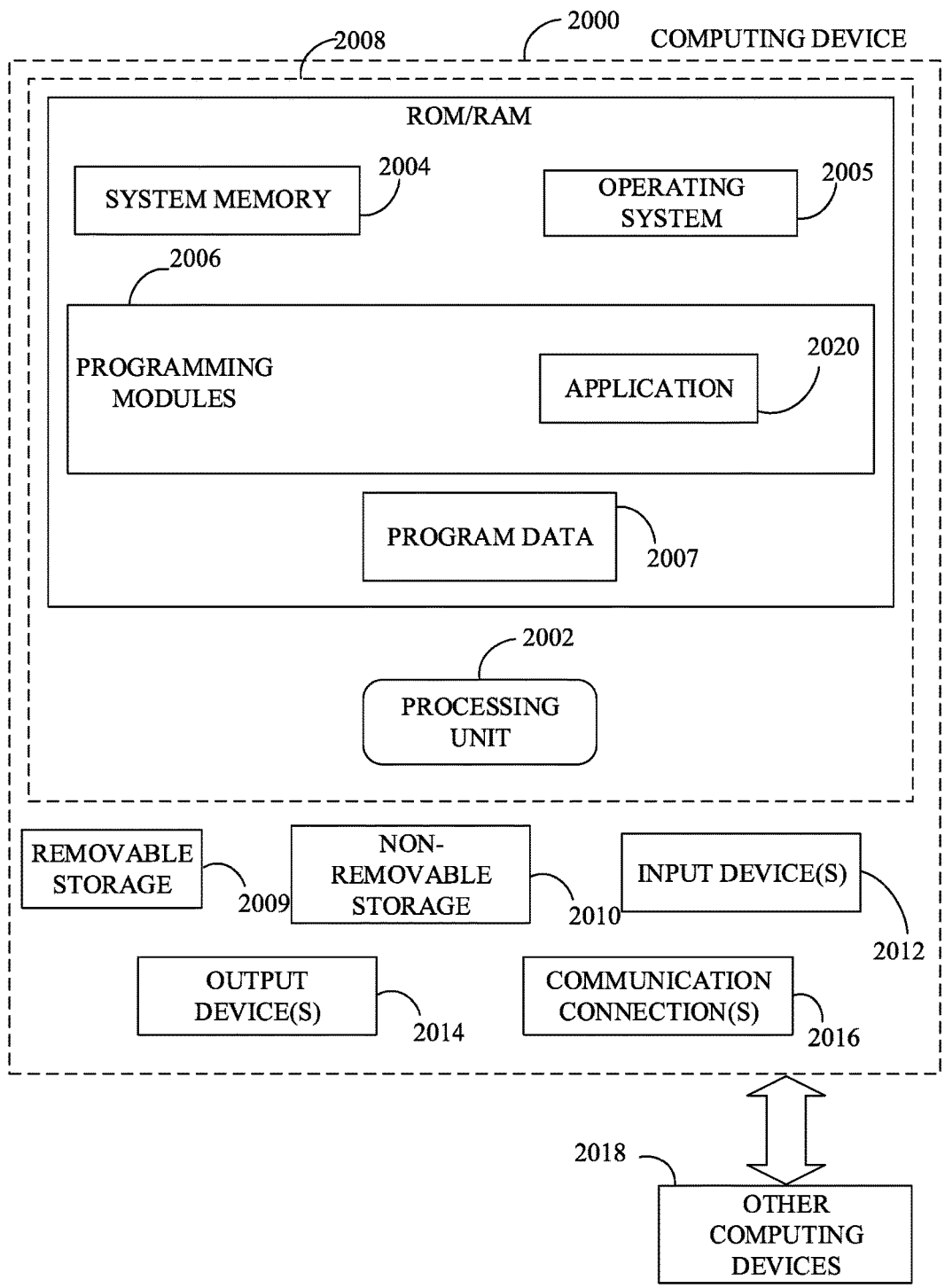
FIG. 20 is a block diagram of a computing device for implementing the methods disclosed herein, in accordance with some embodiments.

With reference to FIG. 20, a system consistent with an embodiment of the disclosure may include a computing device or cloud service, such as computing device 2000. In a basic configuration, computing device 2000 may include at least one processing unit 2002 and a system memory 2004. Depending on the configuration and type of computing device, system memory 2004 may comprise, but is not limited to, volatile (e.g. random-access memory (RAM)), non-volatile (e.g. read-only memory (ROM)), flash memory, or any combination. System memory 2004 may include operating system 2005, one or more programming modules 2006, and may include a program data 2007. Operating system 2005, for example, may be suitable for controlling computing device 2000's operation. In one embodiment, programming modules 2006 may include a sound-processing module, a machine learning module and/or a sound classifying module. Furthermore, embodiments of the disclosure may be practiced in conjunction with a graphics library, other operating systems, or any other application program and is not limited to any particular application or system. This basic configuration is illustrated in FIG. 20 by those components within a dashed line 2008.

Computing device 2000 may have additional features or functionality. For example, computing device 2000 may also include additional data storage devices (removable and/or non-removable) such as, for example, magnetic disks, optical disks, or tape. Such additional storage is illustrated in FIG. 20 by a removable storage 2009 and a non-removable storage 2010. Computer storage media may include volatile and nonvolatile, removable and non-removable media implemented in any method or technology for storage of information, such as computer-readable instructions, data structures, program modules, or other data. System memory 2004, removable storage 2009, and non-removable storage 2010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2000. Any such computer storage media may be part of device 2000. Computing device 2000 may also have input device(s) 2012 such as a keyboard, a mouse, a pen, a sound input device, a touch input device, a location sensor, a camera, a biometric sensor, etc. Output device(s) 2014 such as a display, speakers, a printer, etc. may also be included. The aforementioned devices are examples and others may be used.

Computing device 2000 may also contain a communication connection 2016 that may allow device 2000 to communicate with other computing devices 2018, such as over a network in a distributed computing environment, for example, an intranet or the Internet. Communication connection 2016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2004, including operating system 2005. While executing on processing unit 2002, programming modules 2006 (e.g., application 2020 such as a media player) may perform processes including, for example, one or more stages of methods, algorithms, systems, applications, servers, databases as described above. The aforementioned process is an example, and processing unit 2002 may perform other processes. Other programming modules that may be used in accordance with embodiments of the present disclosure may include sound encoding/decoding applications, machine learning application, acoustic classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the disclosure has been explained in relation to its preferred embodiment, it is to be understood that many other possible modifications and variations can be made without departing from the spirit and scope of the disclosure.

What is claimed is:

1. A communication device for facilitating communication using light radiation, the communication device comprising:
   an input port configured to receive input data;
   a processing device communicatively coupled to the input port;
   a memory device communicatively coupled to the processing device, wherein the memory device is configured to store the input data;
   at least three light emitters configured to emit light radiation characterized by at least three frequencies, wherein the at least three light emitters are communicatively coupled to the processing device, wherein an operational state of the at least three light emitters are controllable by the processing device based on the input data, wherein each of the at least three light emitters is characterized by an elongated form, wherein the at least three light emitters are arranged to form a triangular shape; and a power source configured to provide electrical energy to the at least three light emitters, the processing device and the memory device.

2. The communication device of claim 1, wherein the at least three emitters comprises a first light emitter, a second light emitter and a third light emitter.

3. The communication device of claim 2, wherein the first light emitter is configured to emit light characterized by frequencies in the range 400 THz to 484 THz, wherein the second light emitter is configured to emit light characterized by frequencies in the range 526 THz to 606 THz, wherein the third light emitter is configured to emit light characterized by frequencies in the range 606 THz to 668 THz.

4. The communication device of claim 1 further comprising a wireless receiver communicatively coupled to the input port, wherein the wireless receiver is configured to receive the input data from an external device over a Radio-Frequency (RF) communication channel.

5. The communication device of claim 1 further comprising a microphone communicatively coupled to the input port, wherein the microphone is configured to detect an acoustic signal, wherein the processing device is configured to control the operational state of the at least three light emitters based on the acoustic signal.

6. The communication device of claim 5, wherein the at least three frequencies fall in the range of 300 GHz to 430 THz.

7. The communication device of claim 6, wherein the at least three frequencies are detectable by at least three infrared detectors comprised in a smart-home hub, wherein the smart-home hub is configured to control operation of at least one smart appliance communicatively coupled to the smart-home hub.

8. The communication device of claim 7, wherein the at least three light emitters are configured to be disposed over a wearable article.

9. The communication device of claim 1 further comprising:
an output port communicatively coupled to the processing device; and
a wireless transmitter communicatively coupled to the output port, wherein the wireless transmitter is configured to transmit an output data to an external device over a Radio-Frequency (RF) communication channel.

10. The communication device of claim 1, wherein the processing device is configured to encode the input data into Azureakandt symbols based on the Azureakandt language.

11. The communication device of claim 1, further comprising a clock generator configured to generate a clock signal corresponding to a constant frequency, wherein the operational state of each of the at least three light emitters is exclusively controllable in a time period of the clock signal.

12. The communication device of claim 1, wherein the at least three light emitters comprises a first set of three light emitters, a second set of three light emitters, a third set of three light emitters and a fourth set of light emitters, wherein each of the first set of three light emitters, the second set of three light emitters, the third set of three light emitters and the fourth set of light emitters is arranged to form a triangular shape.

13. The communication device of claim 12, wherein the processing device is configured to encode the input data comprising an alphanumeric symbol into an Azureakandt symbol.

14. The communication device of claim 12, wherein the first set of three light emitters, the second set of three light emitters, the third set of three light emitters and the fourth set of light emitters are arranged linearly.

15. The communication device of claim 12 further comprises at least three Braille cells comprising a first set of three Braille cells, a second set of three Braille cells, a third set of three Braille cells and a fourth set of Braille cells, each of the first set of three Braille cells, the second set of three Braille cells, the third set of three Braille cells and the fourth set of Braille cells is co-arranged with the first set of three light emitters, the second set of three light emitters, the third set of three light emitters and the fourth set of light emitters correspondingly, wherein the at least three Braille cells are communicatively coupled to the processing device, wherein a Braille operational state of the at least three Braille cells are controllable by the processing device, wherein the Braille operational state comprises one of a depressed state and a protruded state.

16. The communication device of claim 1, further comprising at least three Braille cells corresponding to the at least three light emitters, wherein the at least three Braille cells are communicatively coupled to the processing device, wherein a Braille operational state of the at least three Braille cells are controllable by the processing device, wherein the Braille operational state comprises one of a depressed state and a protruded state.

17. A communication device for facilitating communication using light radiation, the communication device comprising:
an input port configured to receive input data;
a processing device communicatively coupled to the input port;
a memory device communicatively coupled to the processing device, wherein the memory device is configured to store the input data;
at least three light emitters configured to emit light radiation characterized by at least three frequencies, wherein the at least three light emitters are communicatively coupled to the processing device, wherein an operational state of the at least three light emitters are controllable by the processing device based on the input data;
at least three Braille cells corresponding to the at least three light emitters, wherein the at least three Braille cells are communicatively coupled to the processing device, wherein a Braille operational state of the at least three Braille cells are controllable by the processing device, wherein the Braille operational state comprises one of a depressed state and a protruded state; and
a power source configured to provide electrical energy to the at least three light emitters, the processing device, the memory device and the at least three Braille cells.

18. The communication device of claim 17, wherein each of the at least three light emitters is characterized by an elongated form, wherein the at least three light emitters are arranged to form a triangular shape, wherein the at least three Braille cells are co-arranged with the at least three light emitters correspondingly.

19. The communication device of claim 17, wherein the at least three emitters comprises a first light emitter, a second light emitter and a third light emitter, wherein the first light emitter is configured to emit light characterized by frequencies in the range 400 THz to 484 THz, wherein the second light emitter is configured to emit light characterized by frequencies in the range 526 THz to 606 THz, wherein the third light emitter is configured to emit light characterized by frequencies in the range 606 THz to 668 THz.

\* \* \* \* \*